July 31, 1956

J. A. ADLOFF ET AL 2,757,016

FRONT AXLE FOR AUTOMOBILE, WITH
INDEPENDENT WHEEL SPRINGING

Filed April 23, 1952

Inventors
Jakob August Adloff &
Adam Zimmer
By
Willits, Helwig & Baillie
Attorneys July 31, 1956  J. A. ADLOFF ET AL  2,757,016
FRONT AXLE FOR AUTOMOBILE, WITH
INDEPENDENT WHEEL SPRINGING
Filed April 23, 1952  2 Sheets-Sheet 2

Inventors
Jakob August Adloff &
Adam Zimmer
By
Willito Helwig & Baillio
Attorneys United States Patent Office 2,757,016
Patented July 31, 1956

2,757,016

FRONT AXLE FOR AUTOMOBILE, WITH INDEPENDENT WHEEL SPRINGING

Jakob August Adloff, Mainz-Gonsenheim, and Adam Zimmer, Mainz-Bischofsheim, Germany, assignors to General Motors Corporation, Detroit, Mich., a corporation of Delaware Application April 23, 1952, Serial No. 288,514

1 Claim. (Cl. 280—106.5)

The invention relates to front wheel suspensions for motor vehicles, in which the wheels are mounted by upper and lower transverse links and are sprung with respect to the vehicle frame by means of unguided helical springs.

The main object of the invention is to simplify the mounting of such constructions.

The invention makes it possible to reduce the number of parts to a minimum, and to diminish the cost of assembly and also the number of working operations. Furthermore, due to the arrangement and formation of resilient rubber between the wheel support assembly and the vehicle frame, the transmission of road noises to the chassis is appreciably damped.

Further features of the invention will be apparent from the following detailed description, with reference to the accompanying drawings, of how the invention can be carried into effect.

In all figures, only one side of the front suspension is shown: the other side is symmetrical about the vertical median plane of the vehicle.

Figure 1:
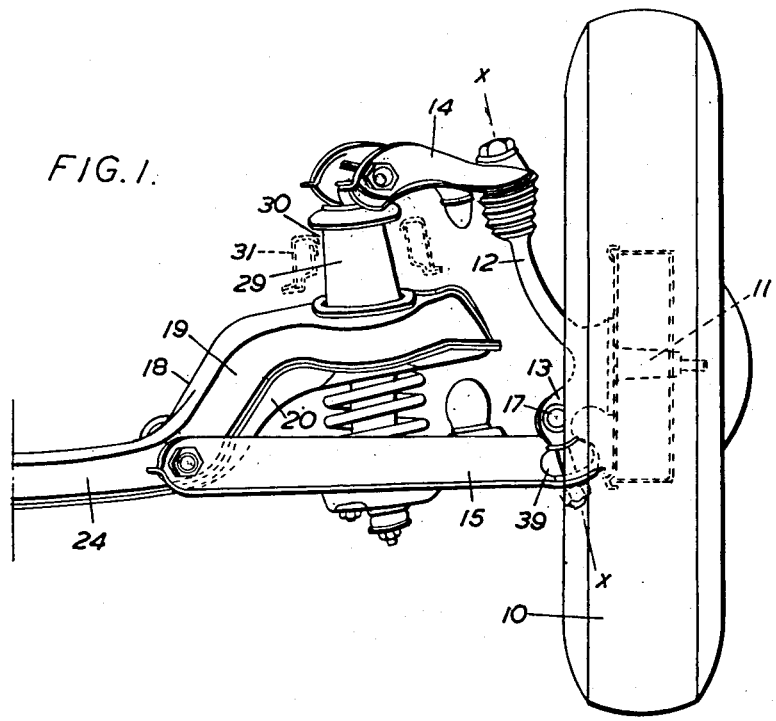
Figure 1 is a front elevation of one wheel and its mounting.
Figure 2:
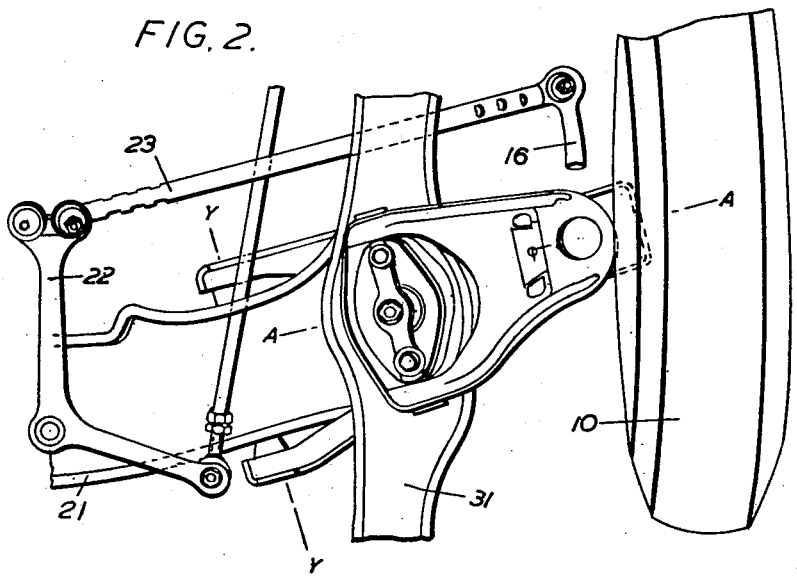
Figure 2 is a plan of the same.

In Figures 1 and 2, the front wheel 10 of the vehicle is mounted on the stub axle 11 which is integral with the upwardly directed arm 12 and downwardly directed arm 13 of the wheel carrier which is pivotally mounted about a substantially vertical axis X—X at the outer ends of upper and lower guide links 14 and 15. Due to the fact that the stub axle 11 is integral with the two arms 12 and 13 and is pivotable about the axis X—X, the usual steering knuckle pivot is dispensed with and a simpler attachment is obtained for the steering knuckle lever 16 (Fig. 2) of the steering linkage 22, 23, by being secured in the drilled eye 17 of the short knuckle arm 13 (Fig. 1).

The lower link 15 is supported on a cross-frame member 18 which preferably consists of two hollow sheet-metal pressings 19 and 20 welded together at their ends and forming a box girder of great strength and torsional stiffness, and which, after all the links and other parts have been secured to it, is incorporated in the frame of the vehicle, as described hereinafter. Over its length, the box girder frame member 18 is made somewhat saddle-shaped thus forming a downwardly depressed central portion 21 (Fig. 1) which affords sufficient space for the crank-case of the engine and at the same time, supports the vertically pivoted lever 22 to which the track rod 23 is connected to form part of the steering linkage.

Figure 3:
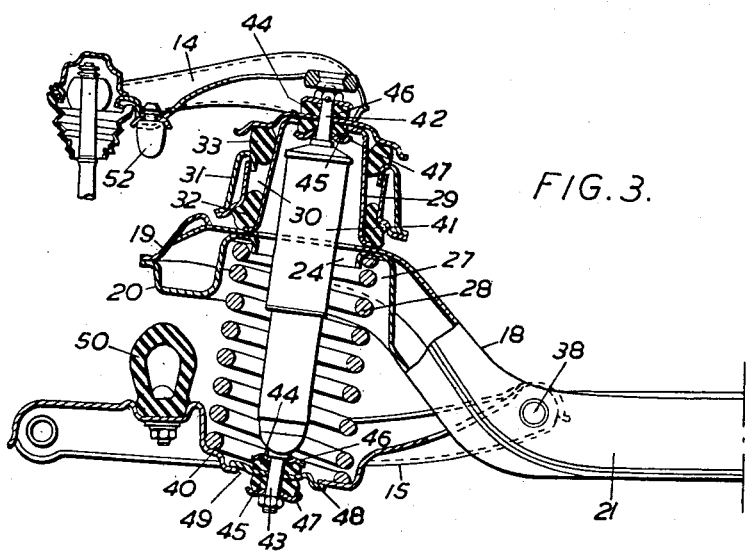
Figure 3 is a vertical section along line A—A of Fig. 2.
Figure 4:
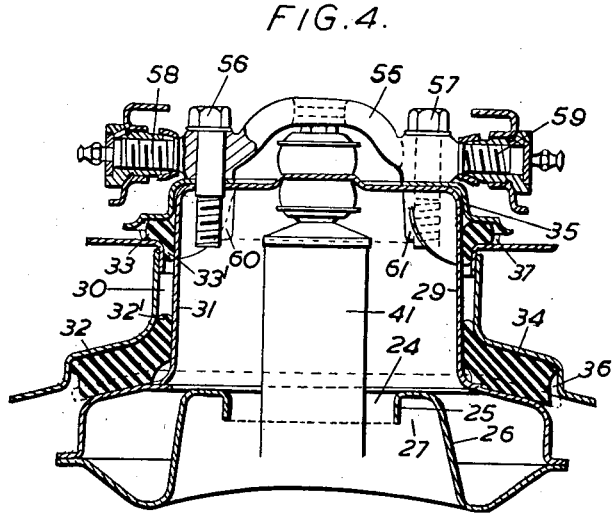
Figure 4 is an enlarged section on line B—B of Fig. 3.

The ends of the member 18 are somewhat flatter but of greater width than the depressed central portion 21, and each end has an opening 24 (Fig. 4) formed by the turned-down edge 25 of a trough 26 formed in the lower sheet-metal pressing 20 of the box girder. The trough 26 may be formed separately and welded to the frame member 18. The circular channel 27 formed by the trough 26 and its edge 25 serves as an abutment for the upper end of an unguided helical spring 28 (Fig. 3). Welded on to the upper sheet-metal pressing 19 of the frame member 18 is a hat-shaped attachment piece 29 which seals off the opening 24 in upwards direction and has an oval cross-section, tapering towards the top.

The lower guide link 15 is pivotally secured to the frame member 18 about an axis Y—Y (Fig. 2), and carries at its outer end a bearing 39 for the lower wheel carrying arm 13. The intermediate portion of the link 15 is shaped into a flat trough 40 to act as an abutment for the bottom end of the helical spring 28 whose upper end is located in the channel 27 of the transverse frame member 18, as above described.

Located inside the helical spring 28 is a telescopic shock-absorber 41 (Fig. 3), secured at its top end to the hat-shaped attachment piece 29 and at its bottom end to the trough 40 of the lower guide link 15. The shock-absorber casing has at each end a threaded bolt, 42 and 43 respectively, which are adapted to pass through holes in the parts 29 and 40 respectively, to which they are attached with the interposition of upper and lower rubber cushions 44, 45 arranged between holding plates 46 and 47. The bottom attachment of the shock absorber 41 incorporates an additional fixing plate 48 between the two rubber cushions, which closes the opening 49 in the trough 40 of the guide member 15 and is secured by means of screws (not shown) to the bottom of the trough 40. In this way, the shock-absorber 41 can be dismantled from below through the opening 49 after releasing the plate 48 and the upper fixing nut on the bolt 42.

The lower guide link 15 carries a rubber buffer 50 which limits the upward movement of the wheel by its contact with the outer end of member 18. A smaller rubber buffer 52 on the upper guide link 14 similarly limits the downward movement of the wheel.

Adjacent an opening 30 (Figs. 3 and 4) in the longitudinal side member 31 of the vehicle frame two annular rubber cushions 32 and 33 are interposed, such that the lower cushion 32 lies between a shoulder 34 in the longitudinal side member 31, and the upper surface of the cross-member 18, whilst the upper cushion 33 is situated between the upper edge of the opening 30 and a top pressure plate 35 resting on the attachment piece 29. In order that the cross-frame member 18 may also be resiliently mounted against lateral movements inside the opening 30, the rubber cushions 32 and 33 have upwardly and downwardly directed flanges 32' and 33' respectively, which project into the opening 30 between the attachment piece 29 and the side member 31. The rubber cushions 32 and 33 are preferably made of very soft rubber so that they have resilience and damping characteristics which transpose the natural vibrations of the system into the region below the audible range. Between the rubber cushions 32 and 33—which in the drawings are shown in the unloaded condition—and their supports 34 and 35, there are cavities 36 and 37: and if the rubber cushions 32 and 33 are more intensely loaded, the rubber fills these cavities 36 and 37 completely, as far as the dotted lines indicated in Figure 4. With such a loading, the softness of the rubber cushions 32 and 33 is considerably reduced, so that they form practically a solid and unyielding layer between the member 18 and the side member 31.

The complete front assembly comprising the cross-frame member 18, the wheel guide links 14 and 15 and the stub axles 11, as well as the helical springs and the shock-absorbers 41, are assembled with the longitudinal side members 31 of the frame, by the hat-shaped attachment pieces 29 being passed upwardly through the openings 30 in the side members 31, but with the inner ends of the upper links 14 not yet attached to the pieces 29.

The bottom rubber cushions 32 are already mounted on the attachment pieces 29 before the member 18 is brought into position; whilst the upper rubber cushions 33 and the pressure plates 35 are mounted after the girder 18 is positioned and the pieces lifted through the openings 30. For the final assembly it is only then necessary for the yoke 55, which is rotatably attached to the inner end of the upper guide link 14, to be secured by means of two screw bolts 56, 57 to the attachment piece 29 of the member 18. The screwed pins 58, 59 on the yoke 55 form the pivots for the forked inner end of the upper guide link 14. The bolts 56, 57 engage in threaded members 60, 61 which are mounted in the interior of the attachment piece 29, for example by means of projection welding. The final securing of the separately assembled front suspension system is thus effected simply by means of the bolts 56 and 57.

What we claim is:

A motor vehicle suspension system comprising a pair of channel section side frame members each having an opening adjacent its front end, a cross frame member having an aperture at each end thereof and an annular recess immediately adjacent the lower peripheral edge of said aperture, said cross frame member having an upwardly extending hat shaped attachment piece closing each said adjacent aperture and projecting through said opening in the respective side member, a pair of upper and lower transversely extending guide links on each side pivoted at their inner ends on said piece and said cross frame member, respectively, a wheel carrying member pivotally mounted on each said pair of guide links at their outer ends, a coil spring mounted between each lower guide link and each of said annular recesses, a telescopic shock absorber mounted on each lower guide link and substantially coaxial with and within an associated one of said coil springs, said shock absorber projecting upwardly through the adjacent aperture in said cross frame and having its upper end connected to said hat shaped attachment, and annular resilient cushion members disposed between said pieces and said side frame members.

References Cited in the file of this patent

UNITED STATES PATENTS

| | | |
|---|---|---|
| 2,263,107 | Smirl | Nov. 18, 1941 |
| 2,334,597 | Badertscher | Nov. 16, 1943 |
| 2,414,674 | Slack et al. | Jan. 21, 1947 |
| 2,604,193 | Wyeth | July 22, 1952 |
| 2,611,625 | Kishline et al. | Sept. 23, 1952 |
| 2,611,627 | Reynolds | Sept. 23, 1952 |